(12) United States Patent
Schaff et al.

(10) Patent No.: US 9,247,043 B1
(45) Date of Patent: Jan. 26, 2016

(54) CARRIER IDENTITY TRANSLATION FOR SPECIAL SERVICE CALLS BASED ON THE ORGANIZATION RESPONSIBLE FOR THE SPECIAL SERVICE ROUTING DATABASE

(75) Inventors: Jonathan E. Schaff, San Leandro, CA (US); Joseph Brent Donelan, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 611 days.

(21) Appl. No.: 13/442,412

(22) Filed: Apr. 9, 2012

(51) Int. Cl.
*H04M 3/42* (2006.01)
*H04M 3/00* (2006.01)

(52) U.S. Cl.
CPC ...................... *H04M 3/00* (2013.01)

(58) Field of Classification Search
CPC .......................... H04M 2203/408; H04W 4/16
USPC .......................................................... 455/415
See application file for complete search history.

(56) References Cited

U.S. PATENT DOCUMENTS

| | | | |
|---|---|---|---|
| 7,929,676 B2 * | 4/2011 | Davis et al. ............. | 379/201.02 |
| 8,537,663 B2 * | 9/2013 | Poulson et al. ............... | 370/228 |
| 2002/0027982 A1 * | 3/2002 | Plunkett et al. ........... | 379/221.02 |
| 2005/0180390 A1 | 8/2005 | Baruzzi et al. | |
| 2011/0040884 A1 | 2/2011 | Khadri et al. | |

\* cited by examiner

*Primary Examiner* — Charles Appiah
*Assistant Examiner* — Randy Peaches

(57) ABSTRACT

In a communication system, a call processing system receives a first signaling message for a special service call indicating a special service number. The call processing system processes the special service number to determine a first carrier identity and an organization identity for a responsible organization that is responsible for a routing database system for the special service number. The call processing system processes the organization identity for the responsible organization to select a second carrier identity. The call processing system transfers a second signaling message that indicates the second carrier identity. In some examples, a communication node receives the second signaling message and processes the second carrier identity to route the special service call to the responsible organization.

19 Claims, 5 Drawing Sheets

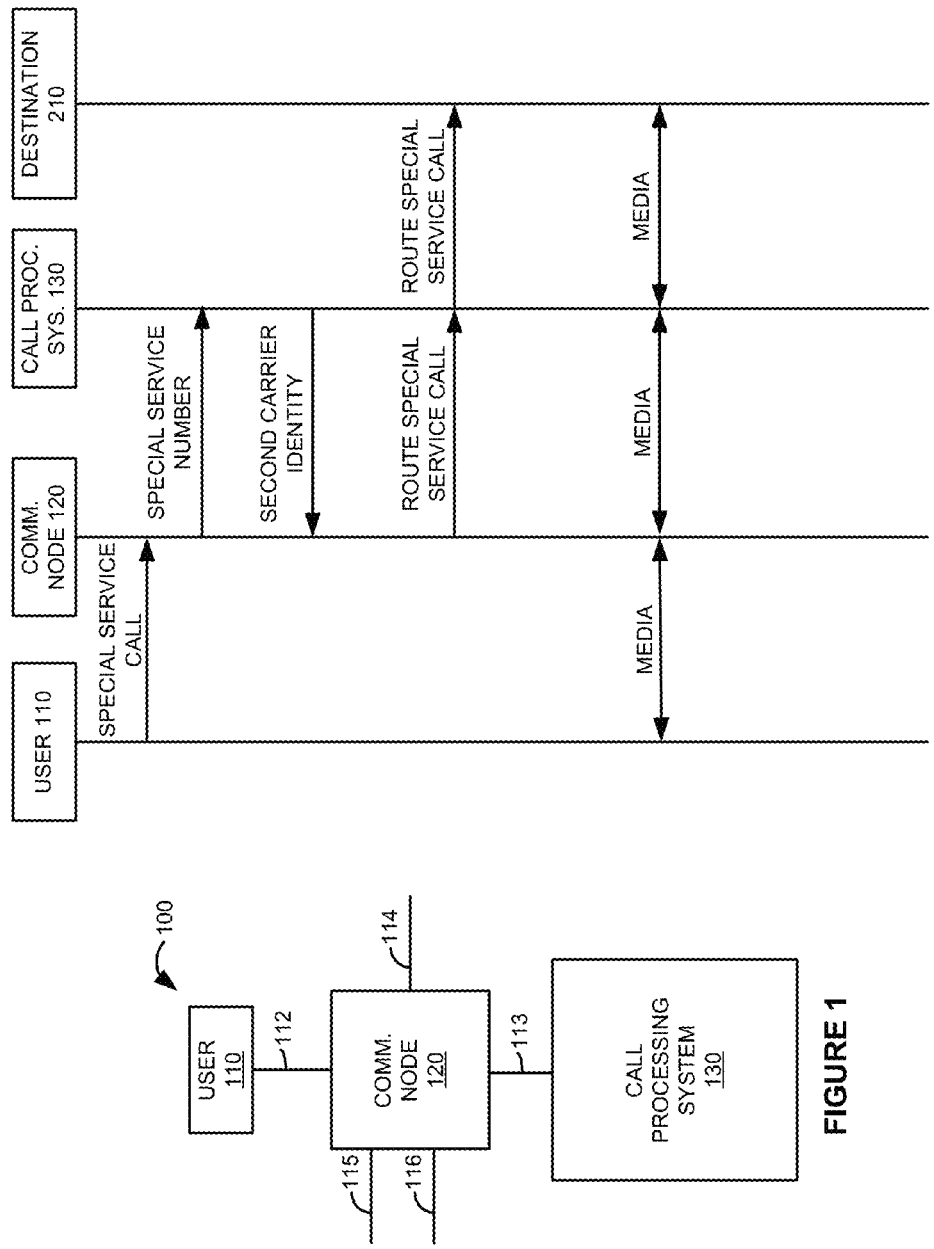

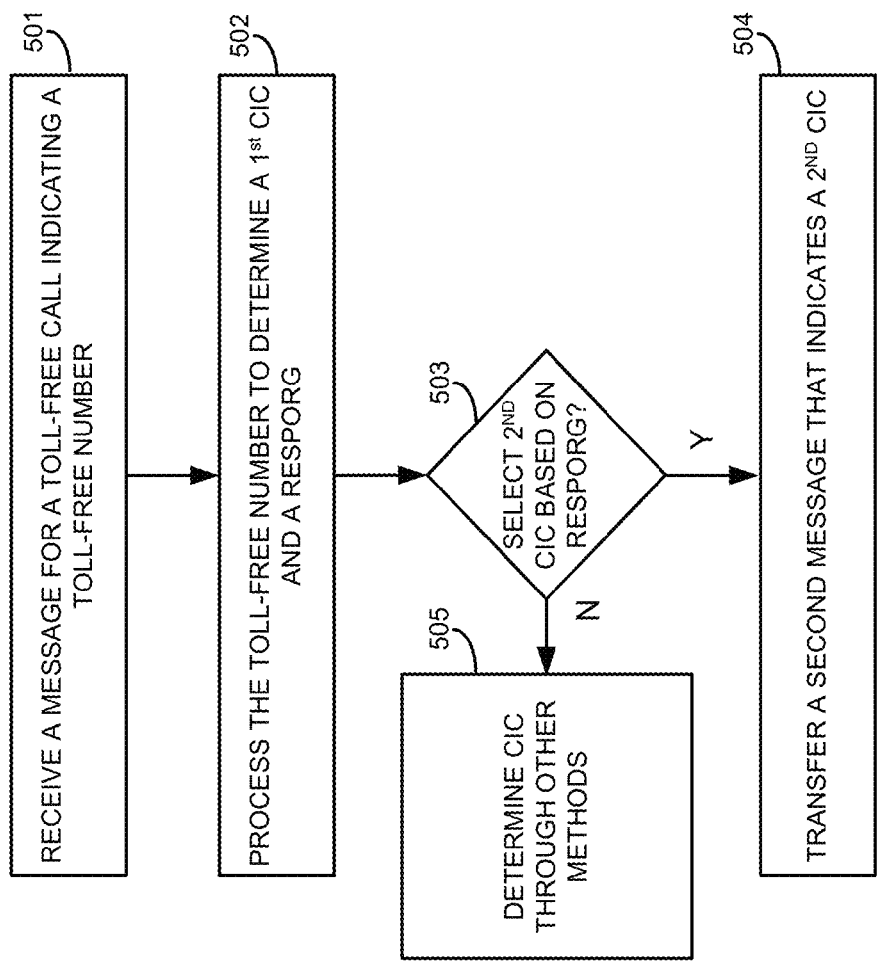

CARRIER IDENTITY TRANSLATION FOR SPECIAL SERVICE CALLS BASED ON THE ORGANIZATION RESPONSIBLE FOR THE SPECIAL SERVICE ROUTING DATABASE

TECHNICAL BACKGROUND

Communication enterprises own special service telephony numbers, such as "800" and "900" type numbers. The communication enterprises lease these special service numbers to various telephony customers, such as retail businesses and government entities who usually receive large volumes of calls. When a call to a special service number is placed, the special service number is typically used to route the call to the communication enterprise that owns the special service number—or its designated host network. The communication enterprise or its host then accesses a special service routing database system to translate the special service number into a routable telephony number using various criteria, such as caller number, time-of-day, customer routing plans, and the like. Thus, the special service numbers trigger dynamically intelligent call routing for the special service telephony customers.

Special service calls may traverse multiple communication networks to reach the communication enterprises that own the special service numbers. The special service calls often utilize signaling systems such as Signaling System 7 (SS7), Session Initiation Protocol (SIP), Long Term Evolution (LTE), and the like. These protocols may use Carrier Identification Codes (CICs) or the like to individually identify the various communication networks. On some special service calls, the communication network is also the enterprise who owns the special service number, and the CIC for that network is used to route the special service calls to the communication network.

The entity that controls the special service routing database system for a given special service telephony number is referred to as the Responsible Organization (RespOrg) for that special service number. The RespOrg is typically one of the communication enterprises described above that also owns and leases special service numbers. In many cases, the communication enterprise that owns the special service number also operates a communication network identified by a CIC, and in these cases, CIC-based routing may be used on special service calls.

In other cases, the communication enterprise that owns the special service number may be the RespOrg, but may not operate a communication network identified by a CIC. In these other cases, the RespOrg enterprise typically contracts with a network operator who does have a CIC. The following technology provides a attractive RespOrg-based routing alternative for these other cases.

OVERVIEW

In a communication system, a call processing system receives a first signaling message for a special service call indicating a special service number. The call processing system processes the special service number to determine a first carrier identity and an organization identity for a responsible organization that is responsible for a routing database system for the special service number. The call processing system processes the organization identity for the responsible organization to select a second carrier identity. The call processing system transfers a second signaling message that indicates the second carrier identity. In some examples, a communication node receives the second signaling message and processes the second carrier identity to route the special service call to the responsible organization.

BRIEF DESCRIPTION OF THE DRAWINGS

FIG. 1 illustrates a communication system to translate carrier identity based on responsible organization.

FIG. 2 illustrates the operation of a communication system to translate carrier identity based on responsible organization.

FIG. 4 illustrates the translation of a CIC based on a RespOrg code.

FIG. 5 illustrates the operation of a call processing system to determine whether to select a second CIC based on a RespOrg.

DETAILED DESCRIPTION

Figure 3:
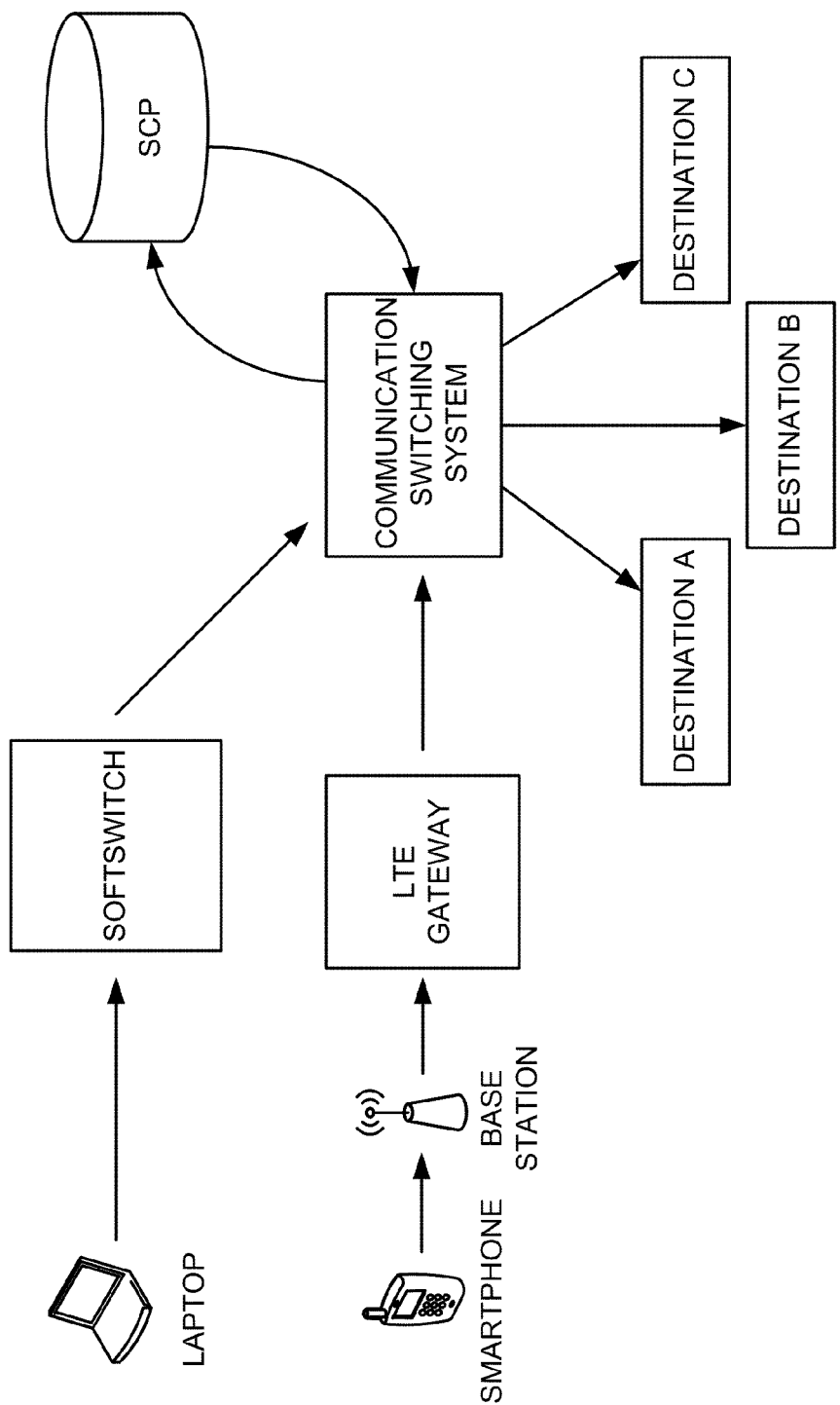
FIG. 3 illustrates the operation of a wireless communication network to translate CICs based on a RespOrg.

FIG. 1 illustrates communication system 100 to translate carrier identity based on responsible organization. Communication system 100 includes user 110, communication node 120, and call processing system 130. User 110 and communication node 120 communicate over access link 112. Communication node 120 and call processing system 130 communicate over access link 113. Communication node 120 routes various media via access links 114, 115, and 116.

FIG. 2 illustrates the operation of communication system 100 to translate carrier identity based on responsible organization. To place a special service call, user 110 transfers a set-up signaling message to communication node 120. The special service call indicates a special service number which could be an "800" type number for a toll-free service or some other special number for some other special service.

Based on the special service number, communication node 120 queries call processing system 130 with a first signaling message for the special service call indicating the special service number. The first signaling message could utilize signaling systems such as Signaling System 7 (SS7), Session Initiation Protocol (SIP), Long Term Evolution (LTE), and the like.

Call processing system 130 processes the special service number to determine a first carrier identity and an organization identity for a responsible organization. The first carrier identity may correspond to a Carrier Identification Code (CIC) for the wireless or wireline communication network that receives the special service call (the originating network) or some other technique for conveying the identity of a communication enterprise. The responsible organization is responsible for a routing database system for the special service number. The organization identity could be a RespOrg corresponding to the responsible organization or some other technique for conveying the identity of the responsible organization. The routing database system could be a service control point (SCP), application server, computer system, and the like.

Call processing system 130 then processes the organization identity for the responsible organization to select a second carrier identity. The second carrier identity may correspond to a CIC for the responsible organization, a wireless or wireline communication network, or may correspond to some other technique for conveying the identity of a communication enterprise. A second signaling message that indicates the second carrier identity may then be transferred by call processing system 130 to communication node 120. The second signaling message could utilize signaling systems such as Signaling System 7 (SS7), Session Initiation Protocol (SIP), Long Term Evolution (LTE), and the like. The second signaling message may include other information such as the organization identity for the responsible organization, the special call number, and so forth.

Communication node 120 may then receive the second signaling message and process the second carrier identity to route the special service call. The special service call may then be routed to destination 210. Destination 210 could be the responsible organization or the telephony customer leasing the special service number.

FIG. 3 illustrates the operation of a wireless communication network to translate CICs based on RespOrg codes. The communication network includes a laptop, a smartphone, a base station, an LTE gateway, a softswitch, a communication switching system, an SCP, and destinations A, B, and C.

FIG. 4 illustrates the translation of a CIC based on a RespOrg code. The communication switching system receives the special service call indicating a special service number, here 1-800-yyy-xxxx. The special service number is then processed to determine a corresponding RespOrg code of ABCD. Once determined, the RespOrg is then used to select a second CIC of 1234. In alternative examples, other systems may already indicate the first CIC and/or the RespOrg along with the special service number when transferring the call to the communication switching system.

FIG. 5 illustrates the operation of a call processing system to determine whether to select a second CIC based on a RespOrg. The steps of the operation are indicated below parenthetically. It should be understood that the CIC and the RespOrg referenced can be replaced with other carrier identities and organization identities, respectively. The communication system receives a first signaling message for a toll-free call indicating a toll-free number (501). The communication system then processes the toll-free number to determine a first CIC and a corresponding RespOrg (502).

The communication system processes the RespOrg to determine whether to select a second CIC (503). In one implementation, the communication system determines whether to select a second CIC based on whether the RespOrg corresponds to a pre-defined RespOrg of interest. In another implementation, the communication system selects a second CIC if the RespOrg does not have a corresponding CIC. In other words, if the responsible organization does not have a corresponding carrier identity, the communication system processes the organization identity for the responsible organization and selects a second carrier identity. In another implementation, the communication system determines whether to select a second CIC based on the number of times a RespOrg is encountered.

If the second CIC is selected based on the RespOrg, it may be selected according to the translation performed in FIG. 4. Once the second CIC is selected, the communication system transfers a second signaling message that indicates the second CIC (504). If the communication system does not select a second CIC based on the RespOrg, the CIC may be determined through other methods (505).

Figure 6:
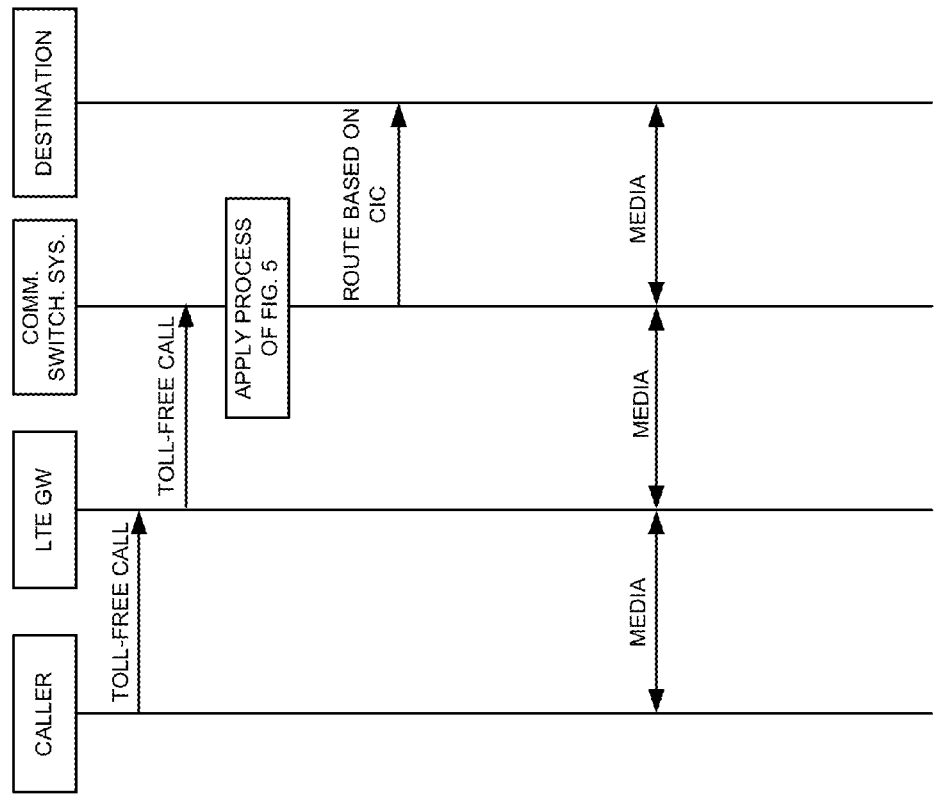
FIG. 6 illustrates the operation of a call processing system to determine whether to translate a CIC based on a RespOrg.

FIG. 6 illustrates the operation of a call processing system to determine whether to translate a CIC based on a RespOrg. The caller places a toll-free call indicating a toll-free number which is transferred to a communication node, here an LTE gateway. The toll-free call is then transferred to a communication switching system. Using the toll-free number, the communication switching system requests routing instructions from the SCP.

The SCP receives the request for routing instructions and applies the process of FIG. 5 to determine whether to select a second CIC based on a RespOrg. The communication switching system then routes the toll-free call to its respective destination based on the resulting CIC.

In one implementation (shown in FIG. 3) the user places a toll-free call using a laptop. The call and corresponding toll-free number are transferred using Voice over Internet Protocol (VoIP). VoIP is an example of a communication network, although other network configurations could be used. The call may be transferred via a wireless or wireline communication network. VoIP network comprises a softswitch which allows the call to be transferred to a communication switching system. The communication switching system could include a call processing system, a communication node, an application server, or some other network control system.

Using the toll-free number, the communication switching system requests routing instructions from the SCP. The SCP receives the request for routing instructions and applies the process of FIG. 5 to determine whether to select a second CIC based on a RespOrg. The system then routes the toll-free call to its respective destination based on the resulting CIC.

In another implementation (shown in FIG. 3) the user places a toll-free call using a smartphone. The call and corresponding toll-free number are transferred using a wireless communication network, although other network configurations could be used. The call is transferred from the smartphone to an LTE base station capable of receiving cellular transmissions. The base station then transfers the call via LTE network to an LTE gateway. The call is then transferred to communication switching system. The communication switching system could include a call processing system, a communication node, and application server, or some other network control system.

Using the toll-free number, the communication switching system requests routing instructions from the SCP. The SCP receives the request for routing instructions and applies the process of FIG. 5 to determine whether to select a second CIC based on a RespOrg. The system then routes the toll-free call to its respective destination based on the resulting CIC.

In some instances, an entity may own and control a special service number, for example a toll-free number, but not operate a communication network. If the entity does not operate a communication network, it will not be identified by a carrier identity, for example a CIC, which indicates how to route the special service number. However, as the entity owns and controls the special service number, it may have an organization identity, for example a RespOrg.

If this were the case, the communication switching system could request an organization identity from the SCP corresponding to the entity's called special service number. The SCP may then select a carrier identity based on the organization identity as shown in FIG. 5. The selected carrier identity could correspond to the entity. The communication switching system could then route the special service call to the entity based on the selected carrier identity.

Figure 7:
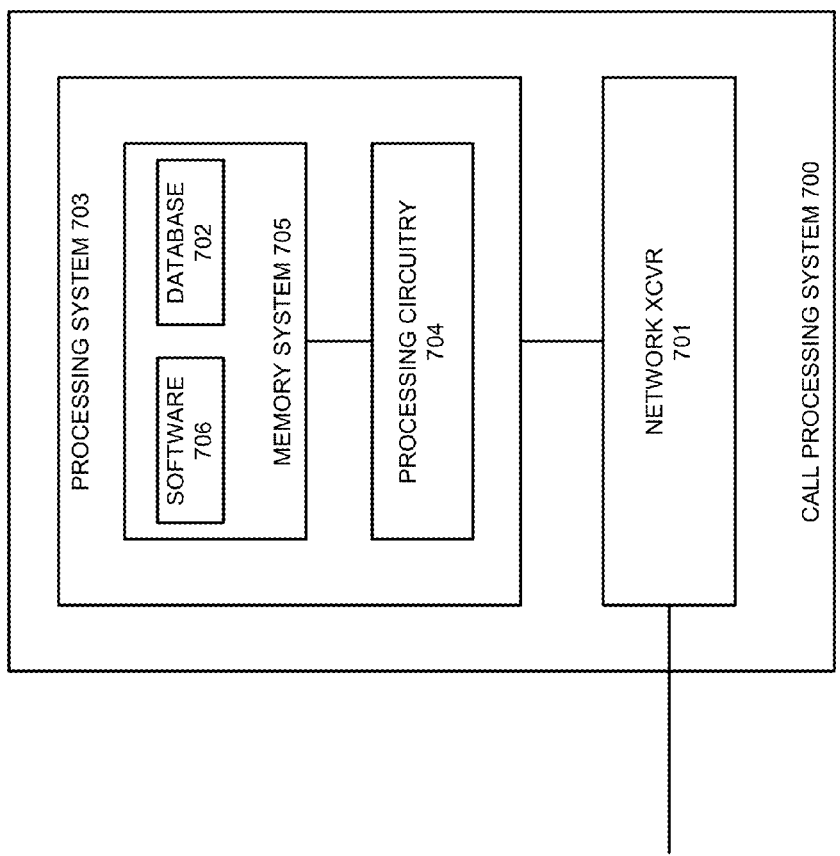
FIG. 7 illustrates a call processing system to translate carrier identity based on responsible organization.

FIG. 7 illustrates call processing system 700 to translate carrier identity based on responsible organization. Call processing system 700 is an example of call processing system 130, although system 130 may use alternative configurations. Call processing system 700 could be a discrete system, a distributed system, and/or could be integrated into other systems, such as in the softswitches. Call processing system 700 comprises network transceiver 701 and processing system 703. Processing system 703 comprises processing circuitry 704 and memory system 705 that stores operating software 706 and database 702. Processing system 703 is linked to transceiver 701. Call processing system 700 may include other well-known components that are not shown for clarity, such as routers, servers, computer systems, databases, and power systems.

Network transceiver 701 comprises a physical communication port, signal processing circuitry, software, and/or some other communication components. Network transceiver 701 may use various protocols, such as IP, TDM, Ethernet, wireless, or some other network communication format—including combinations thereof. Network transceivers 701 exchanges signaling and other control data with communication nodes as described herein.

Processing circuitry 704 comprises microprocessor and other circuitry that retrieves and executes operating software 706 from memory system 705. Memory system 705 comprises a computer-readable storage medium, such as a disk drive, flash drive, data storage circuitry, or some other memory apparatus. Memory system 705 could be a single device or be distributed across multiple devices. Processing circuitry 704 is typically mounted on one or more circuit boards that may also hold memory system 705 and portions of transceiver 701.

Database 702 comprises data structures that associate special service numbers with their corresponding network identifiers of the responsible/controlling networks. The data structures may include special service number translations to yield routable telephone numbers.

Operating software 706 comprises computer programs, firmware, or some other form of computer-readable processing instructions. Operating software 706 may include an operating system, utilities, drivers, network interfaces, applications, or some other type of software. When executed by processing circuitry 704, operating software 706 directs processing system 703 to operate call processing system 700 as described herein for network systems 114 and 604. In particular, call processing system 700 determines whether to translate a carrier identity based on an organization identity.

Referring back to FIG. 1, user 110 comprises communication devices, such as telephones, computers, digital appliances, and the like. Communication node 120 comprises communication equipment, such as switches, routers, gateways, and the like. Call processing system 130 comprises a service control point, application server, computer system, and the like.

Links 112-116 use metal, glass, air, space, or some other material as the transport media. Links 112-116 use may use various communication formats, such as TDM, IP, Ethernet, wireless, SONET, WDM, SIP, SS7, RTP, T1, CDMA, LTE, or some other communication format—including combinations thereof. Links 112-116 may be direct links or they may traverse a combination of links, networks, systems, and devices.

The included descriptions and figures depict specific implementations to teach those skilled in the art how to make and use the best mode. For the purpose of teaching inventive principles, some conventional aspects have been simplified or omitted. Those skilled in the art will appreciate variations from these implementation that fall within the scope of the invention. Those skilled in the art will also appreciate that the features described above can be combined in various ways to form multiple implementations. As a result, the invention is not limited to the specific embodiments described above, but only by the following claims and their equivalents.

What is claimed is:

1. A method of operating a communication system to perform carrier identity translation on special service telephony calls, the method comprising:
   in a call processing system, receiving a first signaling message for a special service call indicating a special service number;
   in the call processing system, processing the special service number to determine a first carrier identity and a Responsible Organization (RespOrg) for a routing database system for the special service number;
   in the call processing system, processing the RespOrg to select a second carrier identity; and
   in the call processing system, transferring a second signaling message that indicates the second carrier identity to a communication node, wherein the communication node processes the second carrier identity to route the special service call to the RespOrg.

2. The method of claim 1 wherein communication node comprises at least one router.

3. The method of claim 1 wherein the RespOrg does not have a corresponding carrier identity.

4. The method of claim 1 wherein the first carrier identity indicates a wireless communication network.

5. The method of claim 1 wherein the first carrier identity and the second carrier identity indicate a wireless communication network and the second carrier identity is associated with the RespOrg in the wireless communication network.

6. The method of claim 1 wherein the special service call comprises a toll-free call.

7. The method of claim 1 wherein at least one of the first carrier identity and the second carrier identity comprise a Carrier Identification Code.

8. The method of claim 1 wherein the RespOrg comprises a Responsible Organization (RespOrg) code.

9. The method of claim 1 wherein at least one of the first signaling message and the second signaling comprises a signaling system 7 message and wherein the call processing system comprises a service control point.

10. A telephony computer apparatus to facilitate carrier identity translation on special service telephony calls, the apparatus comprising:
    telephony software instructions configured, when executed by a telephony computer system, to direct the telephony computer system to process a first signaling message for a special service call indicating a special service number, process the special service number to determine a first carrier identity and a Responsible Organization (RespOrg) for a routing database system for the special service number, process the RespOrg to select a second carrier identity, and initiate a second signaling message that indicates the second carrier identity to a communication node, wherein the communication node processes the second carrier identity to route the special service call to the RespOrg; and
    at least one computer-readable non-transitory storage medium storing the telephony software instructions.

11. The telephony computer apparatus of claim 10 wherein the first carrier identity and the second carrier identity comprises Carrier Identification Codes and wherein the RespOrg comprises a Responsible Organization (RespOrg) code.

12. The telephony computer apparatus of claim 10 wherein the first signaling message and the second signaling message comprise signaling system 7 messages and wherein the telephony computer system comprises a service control point.

13. A communication system to translate carrier identity on special service telephony calls, the system comprising:

a call processing system configured to receive a first signaling message for a special service call indicating a special service number, process the special service number to determine a first carrier identity and a Responsible Organization (RespOrg) for a routing database system for the special service number, process the RespOrg to select a second carrier identity, and transfer a second signaling message that indicates the second carrier identity; and a communication node configured to receive the second signaling message and process the second carrier identity to route the special service call to the RespOrg.

14. The communication system of claim 13 wherein the communication node comprises at least one router.

15. The communication system of claim 13 wherein the RespOrg does not have a corresponding carrier identity.

16. The communication system of claim 13 wherein the first carrier identity indicates a wireless communication network.

17. The communication system of claim 13 wherein the first carrier identity and the second carrier identity indicate a wireless communication network.

18. The communication system of claim 13 wherein the first carrier identity and the second carrier identity comprises Carrier Identification Codes and wherein the RespOrg comprises a Responsible Organization (RespOrg) code.

19. The communication system of claim 13 wherein the first signaling message and the second signaling message comprise signaling system 7 messages and wherein the call processing system comprises a service control point.

\* \* \* \* \*